(12) United States Patent
Slovacek

(10) Patent No.: US 9,106,736 B1
(45) Date of Patent: Aug. 11, 2015

(54) MULTIPLE INTERACTION LIVE MONITORING

(71) Applicant: ZOOM INTERNATIONAL S.R.O., Prague (CZ)

(72) Inventor: Vaclav Slovacek, Prague (CZ)

(73) Assignee: ZOOM International s.r.o., Prague (CZ)

( * ) Notice: Subject to any disclaimer, the term of this patent is extended or adjusted under 35 U.S.C. 154(b) by 0 days.

(21) Appl. No.: 14/299,025

(22) Filed: Jun. 9, 2014

Related U.S. Application Data

(60) Provisional application No. 61/978,964, filed on Apr. 13, 2014.

(51) Int. Cl.
*G06F 15/173* (2006.01)
*H04M 3/36* (2006.01)
*H04M 3/51* (2006.01)

(52) U.S. Cl.
CPC .............. *H04M 3/36* (2013.01); *H04M 3/5175* (2013.01)

(58) Field of Classification Search
USPC ............. 709/224; 379/265, 88.17; 705/14.27, 705/304
See application file for complete search history.

(56) References Cited

U.S. PATENT DOCUMENTS

| | | | |
|---|---|---|---|
| 6,370,574 B1 * | 4/2002 | House et al. .................. | 709/224 |
| 2006/0083362 A1 * | 4/2006 | Anisimov et al. .......... | 379/88.17 |
| 2007/0206767 A1 | 9/2007 | Keren et al. | |
| 2010/0246800 A1 * | 9/2010 | Geppert et al. .......... | 379/265.09 |
| 2013/0054339 A1 * | 2/2013 | Gupta et al. ............... | 705/14.27 |

* cited by examiner

*Primary Examiner* — Kyung H Shin
(74) *Attorney, Agent, or Firm* — Galvin Patent Law LLC; Brian R. Galvin

(57) ABSTRACT

A system for multiple interaction live monitoring, comprising an interaction manager that receives an interaction from a contact center, a recording management server that monitors the interaction, and an administration interface that presents the monitored interaction for viewing by a human user, and a method for multiple interaction live monitoring.

12 Claims, 7 Drawing Sheets

MULTIPLE INTERACTION LIVE MONITORING

CROSS-REFERENCE TO RELATED APPLICATIONS

This application claims priority to U.S. provisional patent application Ser. No. 61/978,964, titled "MULTIPLE INTERACTIVE LIVE MONITORING", which was Apr. 13, 2014, the entire specification of which is incorporated herein by reference.

BACKGROUND OF THE INVENTION

1. Field of the Art

The disclosure relates to the field of contact center operations, and more particularly to the field of monitoring contact center agents.

2. Discussion of the State of the Art

In the field of contact center operations, it is a common need to monitor agents for such purposes as quality or performance review. Generally, this involves recording agent interactions (such as call recording) for later review by a human analyst, and the analyst may need to review multiple recordings, possibly for multiple agents, greatly delaying a review process. Additionally, reviewing recordings after an interaction has occurred prevents any immediate action as might be deemed necessary based on the nature of the recording, such as immediately speaking to an agent if needed. A further issue may be that of changing review policies, for example an agent may be scored on a prior interaction using current criteria that may not have been in effect when the interaction took place, negatively impacting the reliability of review operations.

What is needed is a means to view multiple agent interactions simultaneously, with the ability to view interactions as they are occurring and as necessary provide interactive feedback to an ongoing interaction.

SUMMARY OF THE INVENTION

Accordingly, the inventor has conceived and reduced to practice, in a preferred embodiment of the invention, a system and method for multiple interaction live monitoring.

According to a preferred embodiment of the invention, a system for multiple interaction live monitoring comprising a recording management server that may monitor and record agent interactions (such as by recording audio from a phone call or video recording of an agent's computer screen) of one or more agents and an administration server that may receive these agent recordings and present them for review such as via an integral software review interface (as is described below in an exemplary configuration in FIG. 7), or an external or third-party review system such as via a software application programming interface (API) or other integration means, is disclosed. According to the embodiment, various traditional contact center components may be utilized in connection with the components of the system, such as an interactive voice response (IVR) system that may receive incoming customer interactions (such as telephone calls) and may collect customer information via prompts (as is common practice in the art), an automated call distribution (ACD) server that may route interactions to specific agents for handling, or a computer telephony integration (CTI) server that may facilitate communication between computer and telephony-based networks.

According to the embodiment, an agent may receive an interaction (such as when a customer places a telephone call to a contact center and it is routed to an agent for handling), at which point a recording management server may begin monitoring the interaction. These interactions may be presented as they are occurring to an administration server, such that a review analyst may view them concurrently, or they may optionally be sent for storage in a database or other such storage means for later review, as is common practice in the art. In either case, an administration server may present multiple recordings simultaneously for viewing, and may extract or retrieve relevant information such as the agent's name, a topic of an interaction (as might have been input by an agent after asking the customer probing questions), current agent activities (such as whether or not a call is on hold), and also may utilize various additional or external components such as speech analytics systems or social media integration to provide additional information such as a caller's social networking information or speech qualities that might be determined through software or hardware-based speech analysis (such as detecting whether a customer is irritated, excited or other emotional states, or detecting topics of conversation that may not have been made available via other means). In this manner, the function of the system of the invention may be easily expanded as desirable to include additional functions or to integrate with specific new systems or services or those already in place, enabling ease of integration with current contact center operations.

In another preferred embodiment of the invention, a method for multiple interaction live monitoring comprising the steps of receiving an interaction (such as via an interaction manager), initiating monitoring of the interaction (such as utilizing a recording management server), determining interaction details (such as by receiving agent or customer input, or via integration with various external resources such as social media networks or additional contact center systems), and presenting the interaction along with relevant details in a plural view with additional interactions and their details (such as via an administration server), is disclosed. According to the embodiment, interactions may be presented to a human user for immediate viewing by a variety of means such as a software review interface integral to the administration server (as is described below, referring to FIG. 7), or by presenting the interactions to various external systems or services such as third-party review software or storage systems such as databases, where interactions may be stored for future review as needed. It should be appreciated that while reference may be made herein to specific methods of viewing and as envisioned by the inventor the most benefit may be gained from live viewing, the principle functionality of the invention (that is, the display of multiple interactions and relevant details simultaneously for multiple interaction viewing) may be applied to stored or live interactions, or combinations thereof, interchangeably.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
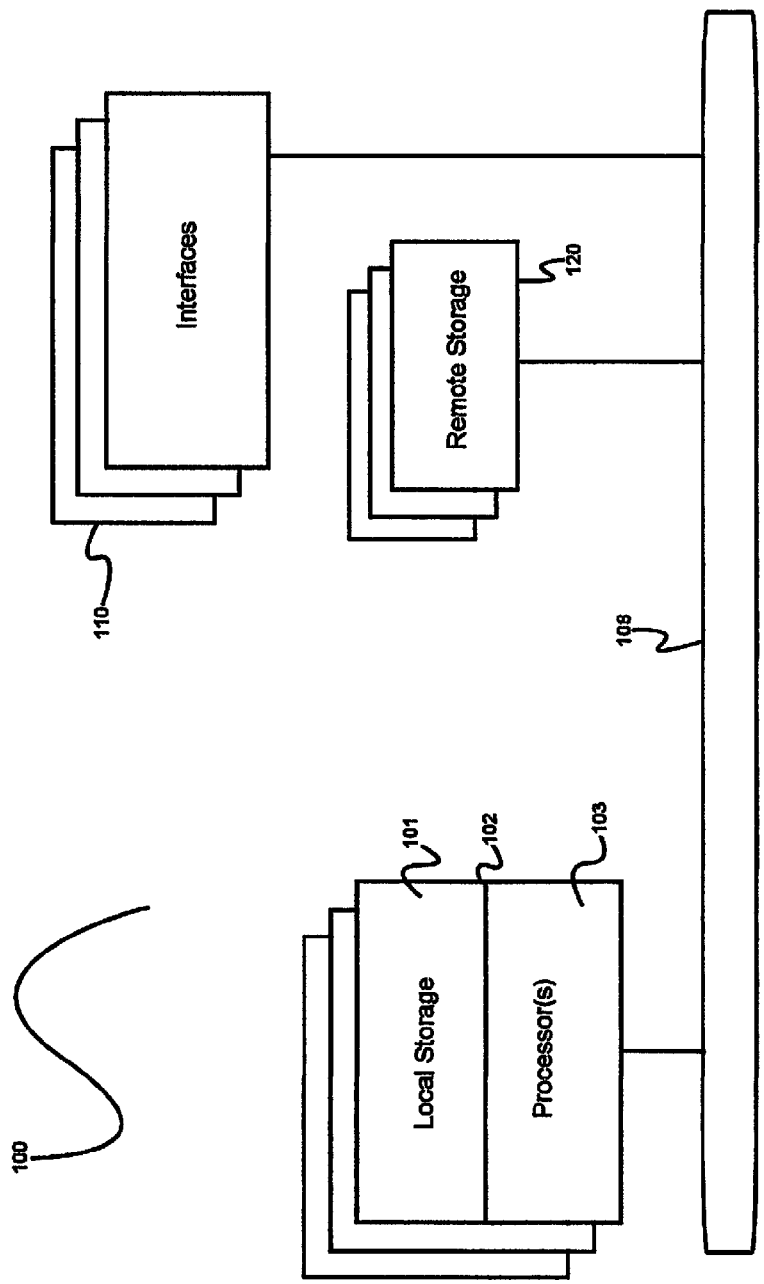
FIG. 1 is a block diagram illustrating an exemplary hardware architecture of a computing device used in an embodiment of the invention.

The inventor has conceived, and reduced to practice, in a preferred embodiment of the invention, a system and method for multiple interaction live monitoring.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
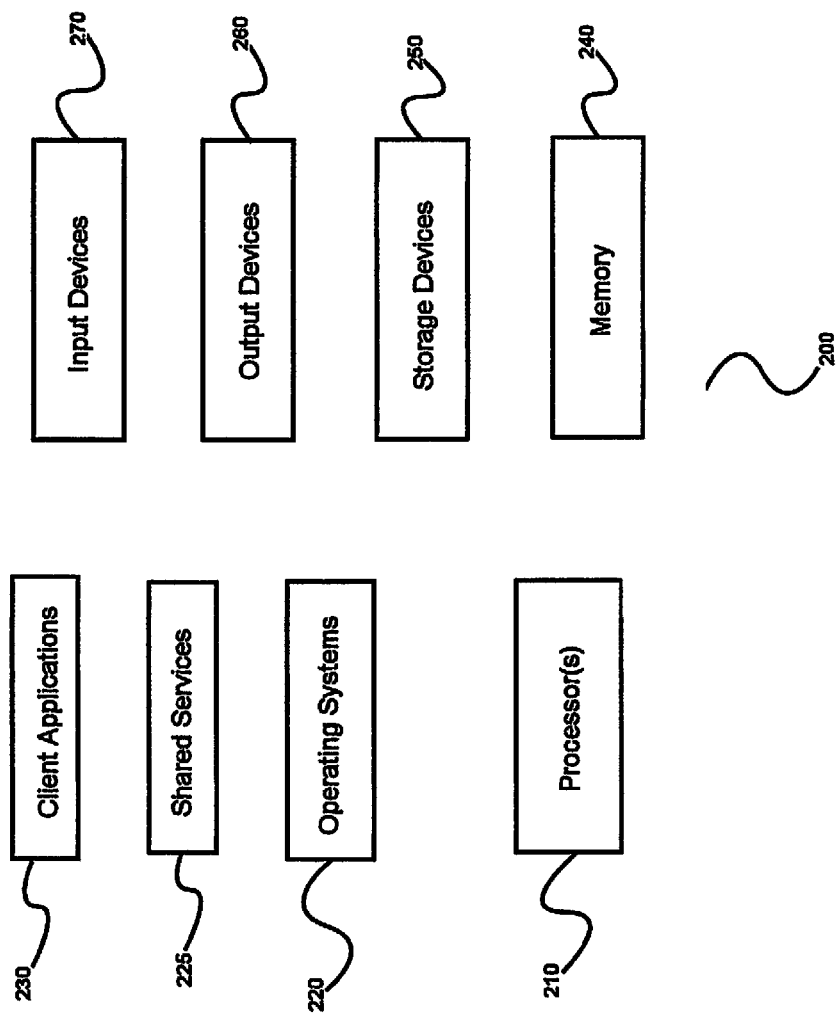
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
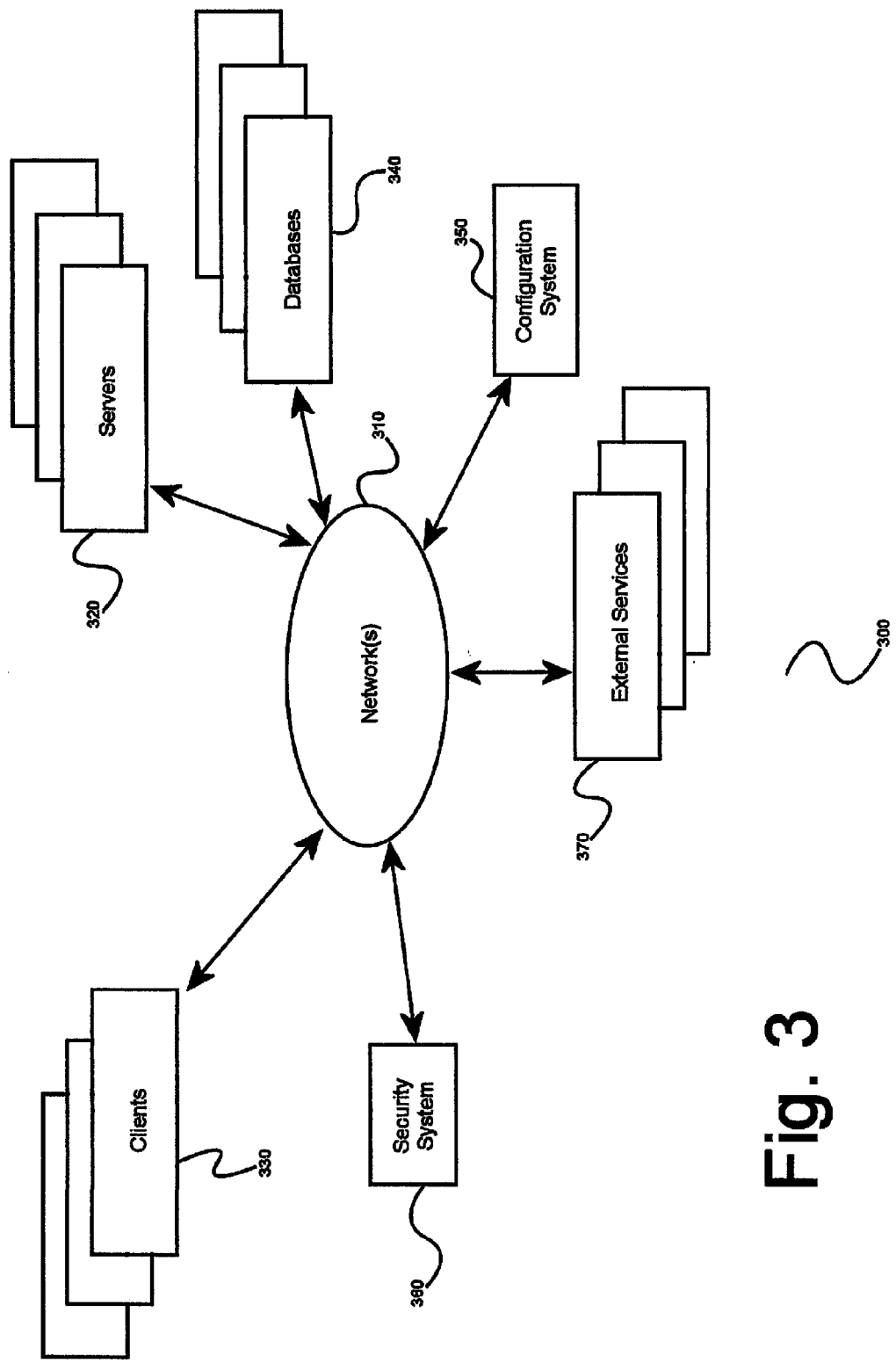
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
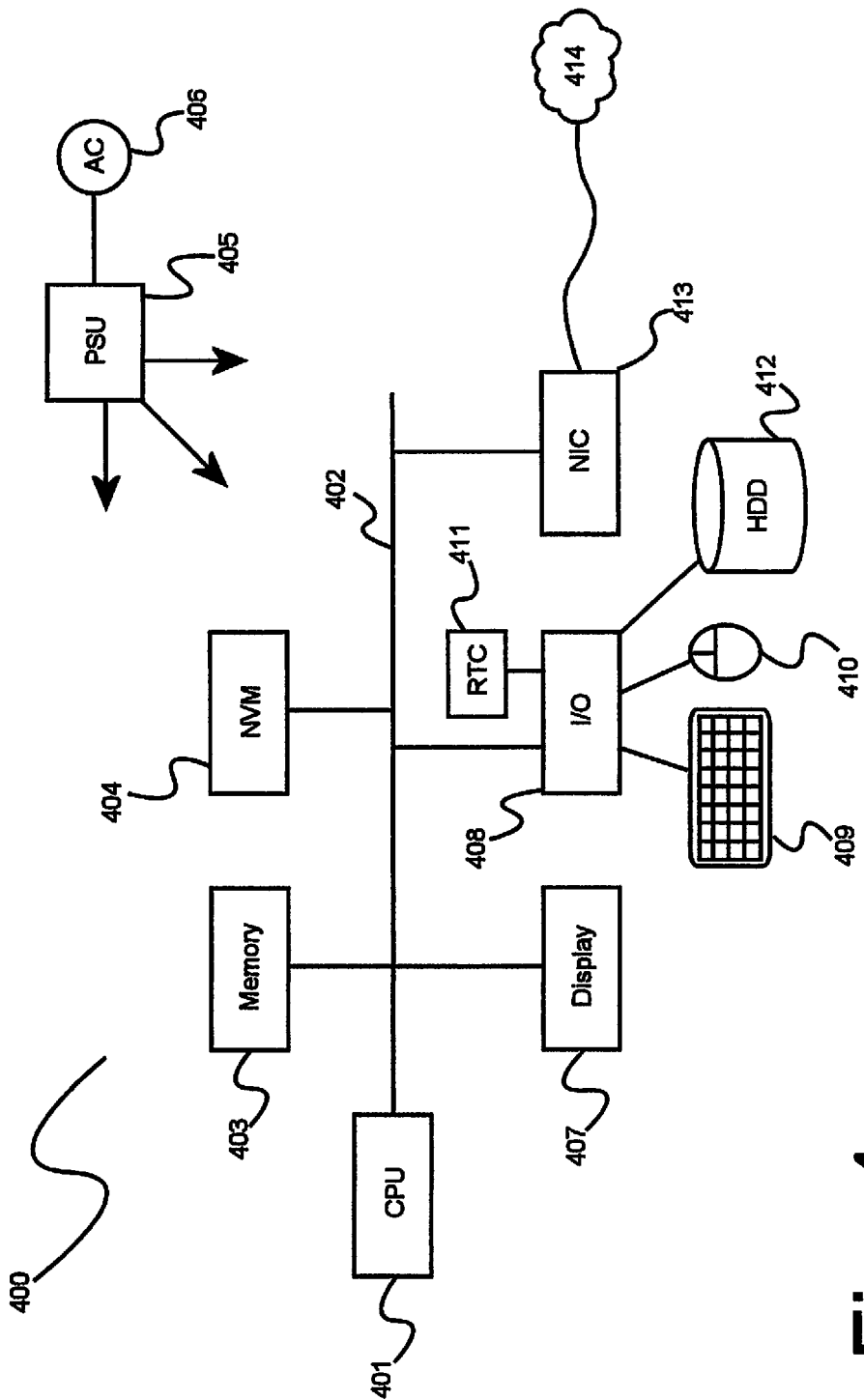
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
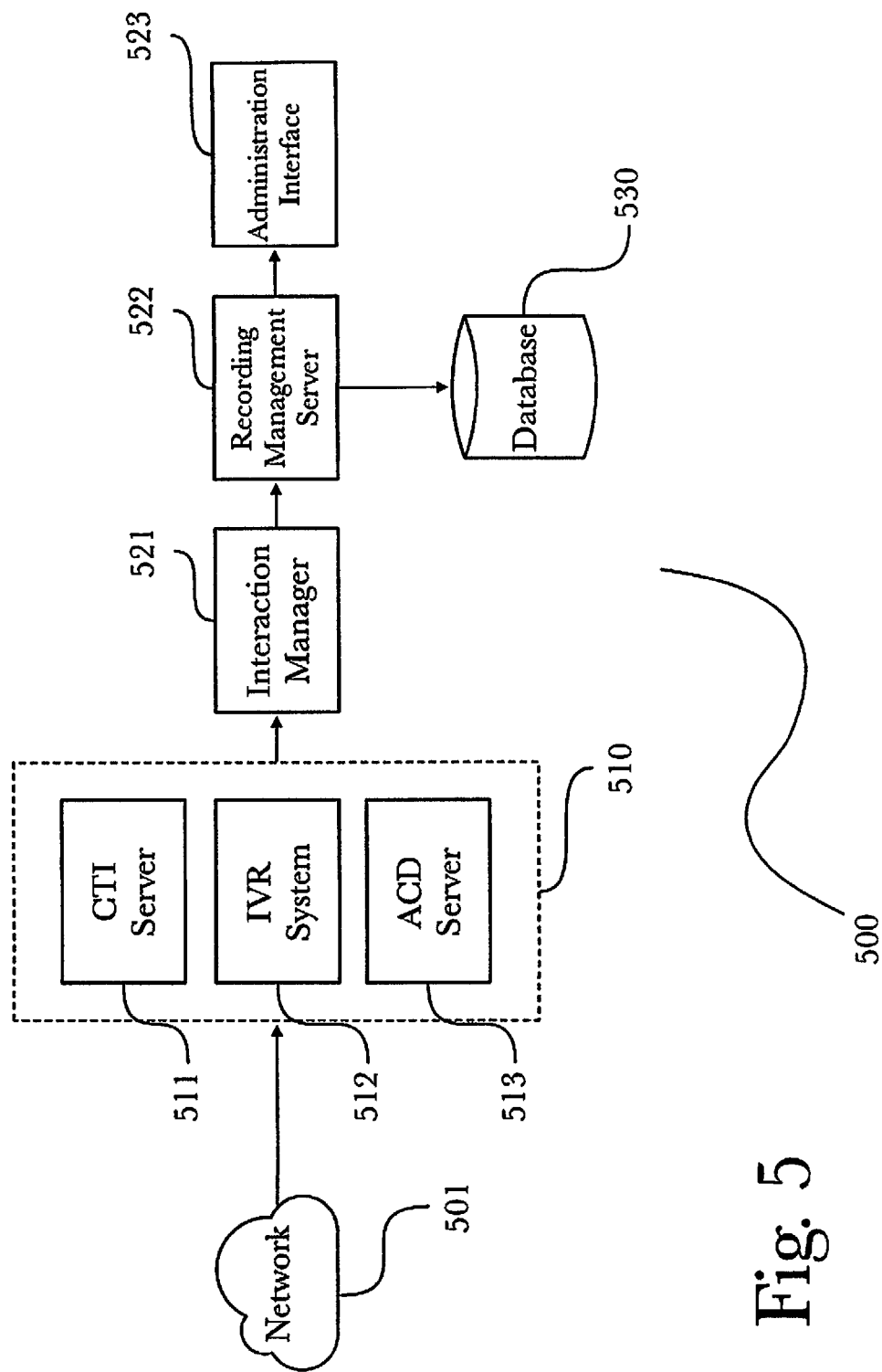
FIG. 5 is a block diagram of an exemplary system architecture for multiple interaction live monitoring, according to a preferred embodiment of the invention.

FIG. 5 is a block diagram of an exemplary system architecture 500 for secure live viewing of multiple interactions, according to a preferred embodiment of the invention. As illustrated, a contact center 510 may be connected to a communications network 501 such as the Internet or a public switched telephone network (PSTN), and may comprise a variety of traditional system components such as a computer telephony integration (CTI) server 511 that may facilitate communication between telephony and computer-based networks such as the Internet, an interactive voice response (IVR) system 512 that may receive incoming customer interaction such as telephone calls and may receive customer input (such as prompts to select a reason for calling for example, as is common practice in the art), and an automated call distribution (ACD) server 513 that may route customer interactions such as to ensure they reach an agent for proper handling.

As further illustrated, a system for multiple interaction live monitoring 520 may be connected to and in communication with a contact center 510, or may be a system operated by a contact center such that the system for multiple interaction live monitoring 520 functions as a component of contact center 510. It should be appreciated that the system 520 is shown separately in a connected fashion for clarity, and a variety of arrangements may be possible according to the embodiment (such as a system 520 operated by a third party and provided as a service to one or more contact centers, for example). A system for multiple interaction live monitoring 520 may comprise an interaction manager 521 that may receive information relevant to an interaction (such as from a CTI server 511, an IVR 512, an ACD server 513 or by direct connection to agent workstations to monitor an interaction in progress), a recording management server 522 that may monitor interactions and provide interaction details (such as audio or video, or detailed information received from an interaction manager 521) to an administration interface 523 that may then present the interaction for either viewing or storage interchangeably, or both simultaneously (such as for a human analyst to observe an interaction while also storing a copy for future reference). In this manner, it can be appreciated that various contact center components may collect and process information on an interaction according to their normal functions, and that an interaction manager 521 may collect and aggregate this information to make it available for easier viewing, and a recording management server 522 may make multiple interactions presentable in an organized fashion, such as via a monitoring interface as illustrated later (referring to FIG. 7). It should also be appreciated that various external systems may be connected to or integrated with the operation of a system 520, such as third-party monitoring tools or services or external storage means such as databases 530 or physical storage devices, or any other such external components that may be connected via hardware (such as via a physical or wired connection, or via a communications network) or software means (such as via an API or other such software integration means), as are common in the art. In this manner, it can be appreciated that the function of a system 520 may be provided as a service to contact centers by making it available for integration or connection to their existing systems, and it should therefore also be appreciated that a single system 520 may provide utility to multiple contact centers simultaneously.

Detailed Description of Exemplary Embodiments

Figure 6:
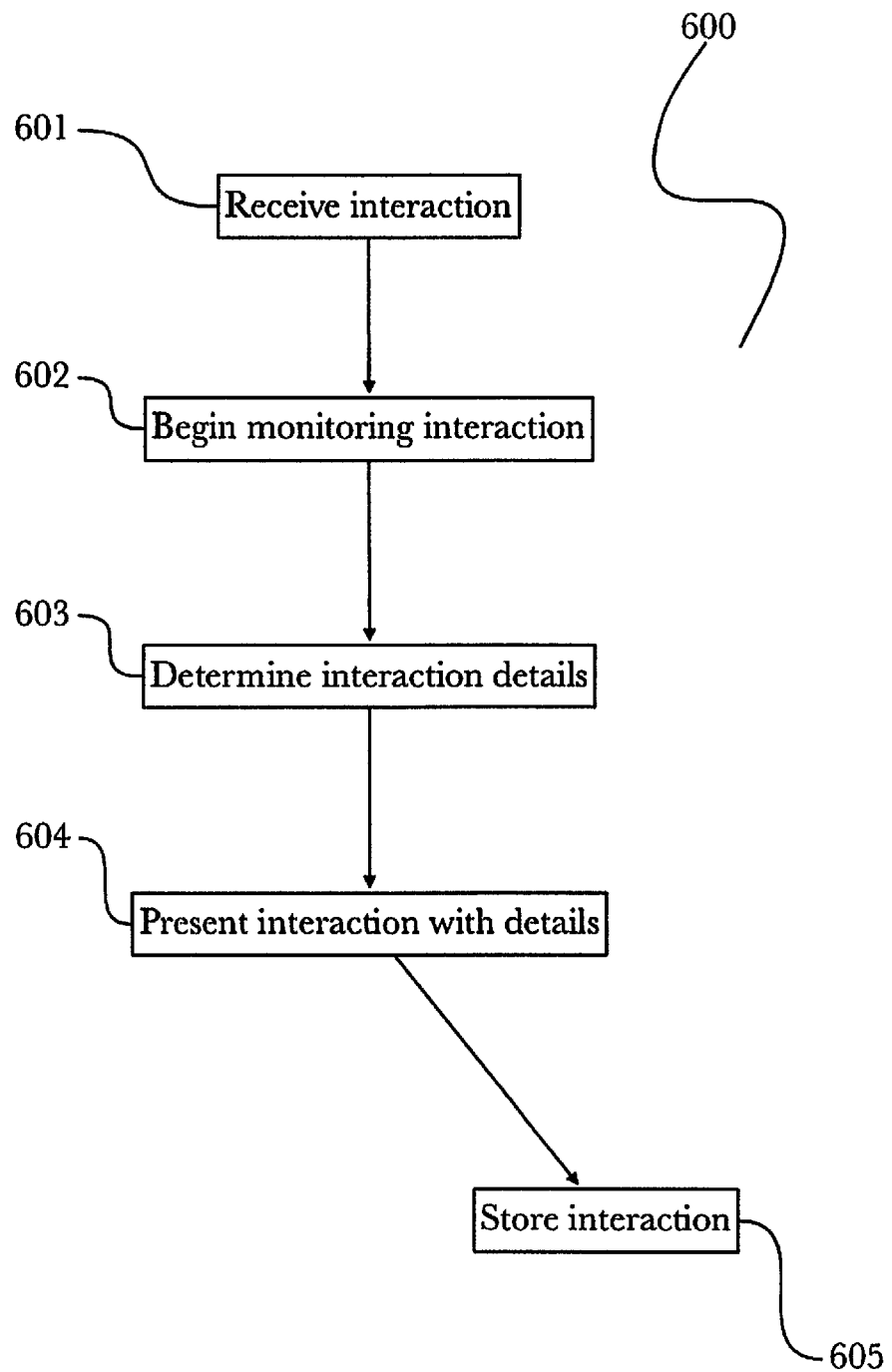
FIG. 6 is a method flow diagram illustrating an exemplary method for multiple interaction live monitoring, according to a preferred embodiment of the invention.

FIG. 6 is a method flow diagram illustrating an exemplary method 600 for secure live viewing of multiple interactions, according to a preferred embodiment of the invention. In an initial step 601, an interaction is received, such as via an interaction manager, for example from a contact center's ACD or other interaction routing component. When an interaction is received, in a next step 602 monitoring may be initiated of the interaction (such as utilizing a recording management server), such that as the interaction is handled it may be monitored "live" or while it is ongoing, as well as enabling the optional storage of the interaction by preserving the monitored recording for future reference (described later in an optional end step). In a next step 603, an interaction manager may determine interaction details such as by receiving agent or customer input (for example from an IVR, or directly from an agent's workstation such as when an agent types in notes or other input based on the interaction in progress), or via integration with various external resources such as social media networks or additional contact center systems, and in a next step 604 presents the interaction along with relevant details in a plural view (that is, alongside other interactions that may have been received currently or previously, thereby incorporating the current interaction into an ongoing presentation of multiple interactions as needed) with additional interactions and their details (such as via an administration server). In an optional end step 605, the interaction may be stored for future reference, such as in a database or other storage medium as appropriate. It should be appreciated that various aspects of the operation described may be configurable, such as via manual input from a review analyst (for example, via an interaction monitoring interface as described below, referring to FIG. 7, or by loading a stored configuration from a database, for example), such as how to present interaction information (or which information to present, for example tailoring the nature of the monitoring to suit a specific review use), or to select how many interactions to display, or how to arrange them, or any other such configuration as may be deemed relevant to operation by a contact center in general or by an analyst in particular.

Figure 7:
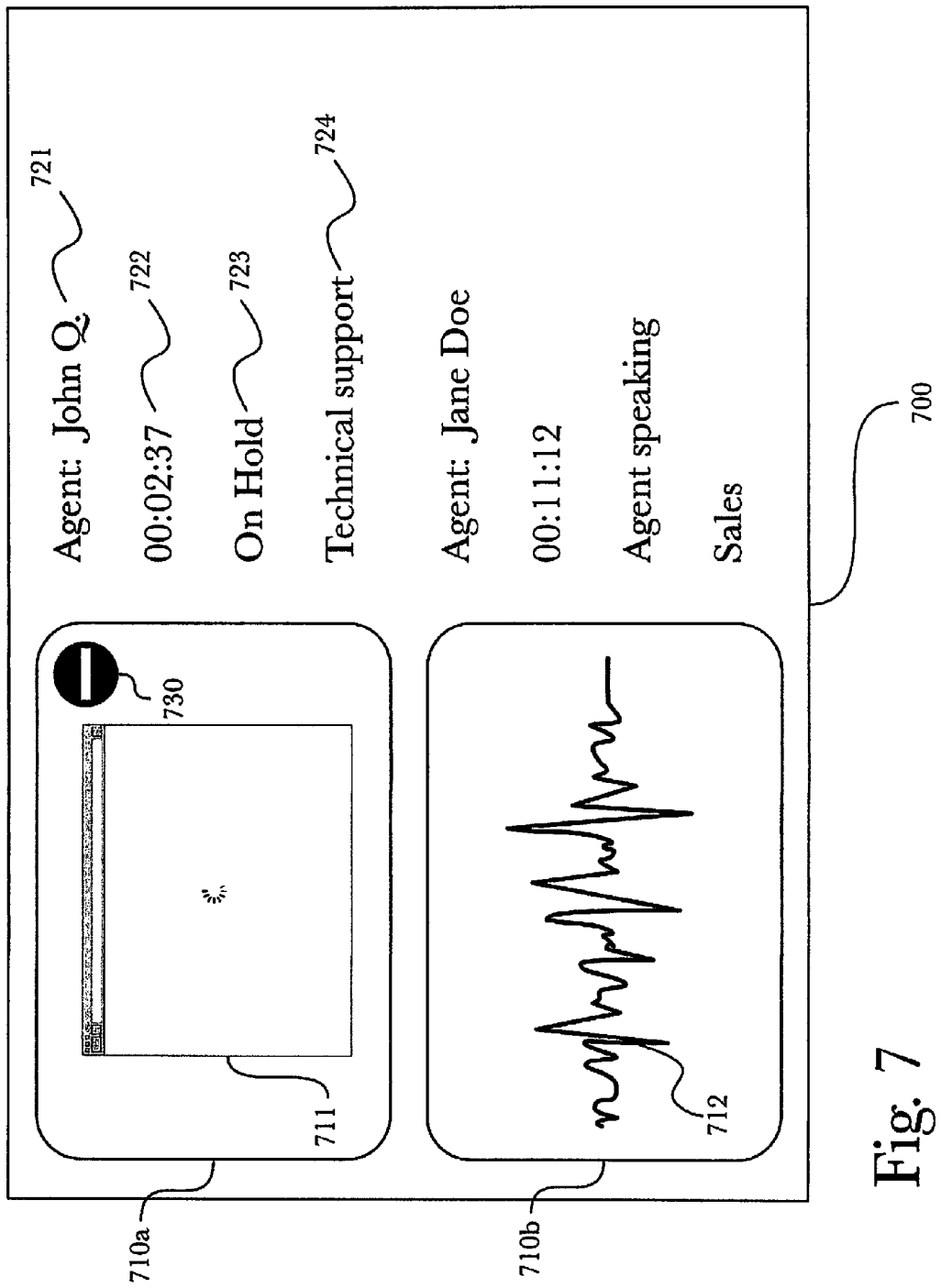
FIG. 7 is an illustration of an exemplary interaction viewing interface, illustrating the presentation of multiple interactions and relevant details for viewing.

FIG. 7 is an illustration of an exemplary interaction viewing interface 700, illustrating the presentation of multiple interactions and relevant details for viewing. As illustrated, a main windows 710*a*, 710*b* may be displayed, and may comprise (for example) a view of video capture from an interaction (such as a view of an agent's computer screen 711, or a display of a video call in progress showing one or more parties involved), or an audio placeholder such as a waveform 712, in interactions that have no video. Next to a main display, a variety of relevant details for an interaction may be shown, such as an agent's name or other identifier 721 (such as an agent ID), the current runtime of the interaction 722, a current interaction state or activity 723 (such as indicating that an agent has placed a customer on hold 723*b*), or any of a variety of customer or interaction-specific information details 724 such as customer name, interaction topic, or various external information that may be available through the use of connected systems such as social media networks or contact center systems such as customer account information, or any other such information that may be relevant to an interaction in general or to a review operation in particular.

Additionally, any combination of details shown may be made interactive, such that an analyst viewing an interaction may click or otherwise interact with the interface to perform operations such as to expand an interaction view (for example, to enlarge it and minimize other interactions so a user may focus on a particular interaction), to provide feedback to an agent during an interaction, to notify a supervisor of an agent in need of coaching or assistance, or to view additional information related to the agent, customer, or interaction or to change the manner in which information is displayed (such as to customize the display for a single interaction, or to modify the display for all interactions going forward). In this manner, a monitoring interface 700 may serve as a communication interface between an analyst and agents as needed, facilitating immediate feedback on review operations rather than providing feedback to an agent at a later time when they may have forgotten about a specific interaction (as is common practice in the art, when interactions are stored and reviewed at a later time rather than viewed while in progress).

An additional feature of a live display of an interaction as described herein, may be the use of monitoring for key performance indicators (KPIs) such as specific phrases or actions that may indicate performance issues or coaching opportunities that should be addressed, as well as monitoring agent behavior such as to ensure that they are focused on an interaction and following operational procedures (such as not using their workstation for personal use during an interaction, for example viewing blacklisted webpages, playing games, or other non-interaction-related activity). In this manner, a display may indicate agents that are not following interaction-related activities, such as by displaying a visual indicator 730 to notify a viewer that an agent is not paying attention or is performing restricted activities during an interaction, or optionally an audio notification such as a tone or verbal cue may be sounded, or other such indicators that may be used to get the attention of a viewer and direct them to the specific agent in question. It should be appreciated that while reference is made to indicating agents performing restricted activities, such an indication may be made for a variety of purposes such as any form of sorting or ordering of interactions, or indicating an interaction to a user for ease of location for various purposes, or for indicating interactions optionally matching a search query submitted by a user (such as to pick out a particular interaction from a display of numerous interactions, rather than manually searching for it), or any other such purpose that may make use of an indication or notification functionality.

The skilled person will be aware of a range of possible modifications of the various embodiments described above. Accordingly, the present invention is defined by the claims and their equivalents.

What is claimed is:

1. A system for multiple simultaneous interaction live monitoring, comprising:

an interaction manager computer comprising a first set of programming instructions stored in a memory and operable via a processor of the interaction manager computer, the interaction manager computer connected to a network via a network interface, the first set of programming instructions operable to:

receive a plurality of interactions and a plurality of interaction details for each received interaction from a contact center, the interaction details comprising at least a plurality of information descriptive of the content of an interaction;

a recording management server computer comprising a second set of programming instructions stored in a memory and operable via a processor of the recording management server computer to capture live audio or video from interactions for live monitoring, the recording management server computer connected to a network via a network interface, the second set of programming instructions operable to:

capture a plurality of interactions received from the interaction manager computer and associate them with their relevant interaction details; and an administration interface computer comprising a third set of programming instructions stored in a memory and operable via a processor of the administration interface computer, the administration interface connected to a network via a network interface, the third set of programming instructions operable to:

receive at least two interactions and their associated interaction details from the recording management server computer via a network; and presenting the at least two interactions with their associated interaction details simultaneously in a multiple interaction display for live monitoring by a human user.

2. The system of claim 1, further wherein the administration interface computer receives input from the human user and updates displayed interaction details based at least in part on the input information received from the user.

3. The system of claim 1, further comprising an automated call distributor computer comprising a fourth set of programming instructions stored in a memory and operable via a processor of the automated call distributor computer, the automated call distributor computer connected to a network via a network interface, the fourth set of programming instructions operable to provides interactions to the interaction manager computer;

wherein the automated call distributor computer routes interactions to contact center agents.

4. The system of claim 1, further comprising an interactive voice response computer, wherein the interactive voice response computer receives a customer interaction via a network and provides the interaction to the interaction manager computer.

5. The system of claim 4, further wherein the interactive voice response computer collects interaction details from the customer and provides the details to the interaction manager computer.

6. The system of claim 5, further wherein the interaction manager computer provides the interaction details to the recording management server computer.

7. The system of claim 6, further wherein the recording management server computer provides the interaction details to the administration interface computer for presentation within the multiple interaction display.

8. The system of claim 5, wherein interaction details are further collected from public information storage.

9. The system of claim 8, wherein the public information storage comprises at least a social network.

10. The system of claim 5, wherein interaction details are further collected from private information storage.

11. The system of claim 10, wherein the private information storage comprises at least a customer service management system.

12. A method for multiple interaction live monitoring, comprising the steps of:

receiving, at an interaction manager stored and operating on a network-connected computer, a first interaction and a plurality of interaction details for the first interaction, the interaction details for the first interaction comprising at least a plurality of information descriptive of the content of the first interaction;

monitoring, via a recording management server stored and operating on a network-connected computer, the first interaction;

associating the first interaction with the plurality of interaction details for the first interaction;

receiving, at the interaction manager, a second interaction and a plurality of interaction details for the second interaction, the interaction details for the second interaction comprising at least a plurality of information descriptive of the content of the second interaction;

monitoring, via the recording management server, the second interaction;

associating the second interaction with the plurality of interaction details for the second interaction;

displaying, via an administration interface stored and operating on a network-connected computer, at least the second interaction and its associated interaction details recording in a multiple interaction display with the first interaction and its associated interaction details; and storing the first interaction along with the plurality of interaction details for the first interaction and the second interaction along with the plurality of interaction details for the second interaction by a recording management server computer for future reference.

* * * * *